(12) United States Patent
López Espejo et al.

(10) Patent No.: US 11,869,513 B2
(45) Date of Patent: Jan. 9, 2024

(54) AUTHENTICATING A USER

(71) Applicant: VERIDAS DIGITAL AUTHENTICATION SOLUTIONS, S.L., Tajonar (ES)

(72) Inventors: Iván López Espejo, Tajonar (ES); Santiago Prieto Calero, Tajonar (ES); Ana Iriarte Ruiz, Tajonar (ES); David Roncal Redín, Tajonar (ES); Miguel Ángel Sánchez Yoldi, Tajonar (ES); Eduardo Azanza Ladrón, Tajonar (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 465 days.

(21) Appl. No.: 17/142,775

(22) Filed: Jan. 6, 2021

(65) Prior Publication Data

US 2021/0125619 A1 Apr. 29, 2021

Related U.S. Application Data

(63) Continuation of application No. PCT/EP2018/072918, filed on Aug. 24, 2018.

(30) Foreign Application Priority Data

Jul. 6, 2018 (EP) .................................. 18382505

(51) Int. Cl.
*G10L 17/08* (2013.01)
*G10L 17/04* (2013.01)
(Continued)

(52) U.S. Cl.
CPC .............. *G10L 17/08* (2013.01); *G06F 21/32* (2013.01); *G10L 17/04* (2013.01); *G10L 17/22* (2013.01);
(Continued)

(58) Field of Classification Search
CPC ......... G10L 17/08; G10L 17/04; G10L 17/22; G10L 17/12; G10L 25/60; G06F 21/32; H04L 63/0861
(Continued)

(56) References Cited

U.S. PATENT DOCUMENTS 6,804,647 B1 * 10/2004 Heck ....................... G10L 17/04
704/270.1
8,437,513 B1 * 5/2013 Derakhshani ........... G06F 18/00
382/117
(Continued)

FOREIGN PATENT DOCUMENTS

CN 108039177 A * 5/2018
CN 108039177 A 5/2018
(Continued)

OTHER PUBLICATIONS

International Search Report and Written Opinion received in international application No. PCT/EP2018/072918, dated May 6, 2019 (17 pages).

*Primary Examiner* — Edwin S Leland, III
(74) *Attorney, Agent, or Firm* — Edell, Shapiro & Finnan, LLC (57) ABSTRACT

Methods of authenticating a user or speaker are provided. These methods include obtaining an input speech signal and user credentials identifying the user or speaker. The input speech signal includes a single-channel signal or a multi-channel speech signal. The methods further include extracting a speech voiceprint from the input speech signal, and retrieving a reference voiceprint associated to the user credentials. The methods still further include determining a voiceprint correspondence between the speech voiceprint
(Continued)

and the reference voiceprint, and authenticating the user or speaker depending on said voiceprint correspondence. The methods yet further include updating the reference voiceprint depending on the speech voiceprint corresponding to the authenticated user or speaker. Computer programs, systems and computing systems are also provided which are suitable for performing said methods of authenticating a user or speaker.

20 Claims, 4 Drawing Sheets

(51) Int. Cl.
- *G10L 17/22* (2013.01)
- *G06F 21/32* (2013.01)
- *H04L 9/40* (2022.01)
- *G10L 17/12* (2013.01)
- *G10L 25/60* (2013.01)

(52) U.S. Cl.
CPC .......... *H04L 63/0861* (2013.01); *G10L 17/12* (2013.01); *G10L 25/60* (2013.01)

(58) Field of Classification Search
USPC ........................................................ 704/246
See application file for complete search history.

(56) References Cited

U.S. PATENT DOCUMENTS

| | | | | |
|---|---|---|---|---|
| 10,176,362 B1* | 1/2019 | Krishnapura | ...... | G06V 40/1365 |
| 10,262,187 B1* | 4/2019 | Russo | ................ | G06V 40/1376 |
| 2004/0122669 A1* | 6/2004 | Aronowitz | ............ | G10L 15/065 |
| | | | | 704/250 |
| 2015/0242605 A1* | 8/2015 | Du | .......................... | G06F 21/32 |
| | | | | 726/7 |
| 2015/0249664 A1* | 9/2015 | Talhami | .............. | H04L 63/0861 |
| | | | | 726/6 |
| 2015/0301796 A1* | 10/2015 | Visser | ..................... | G10L 17/22 |
| | | | | 715/728 |
| 2017/0110130 A1* | 4/2017 | Sharifi | ..................... | G10L 17/02 |
| 2017/0110144 A1* | 4/2017 | Sharifi | ..................... | G10L 15/02 |
| 2017/0140760 A1* | 5/2017 | Sachdev | .................. | G10L 17/02 |
| 2017/0220786 A1* | 8/2017 | Guo | ......................... | G06F 21/36 |
| 2018/0129857 A1* | 5/2018 | Bonev | ................ | G06V 40/1365 |
| 2018/0129858 A1* | 5/2018 | Russo | ................ | G06V 40/1365 |
| 2019/0005963 A1* | 1/2019 | Alonso | .................... | G10L 25/03 |
| 2019/0355380 A1* | 11/2019 | Hatfield | ............... | H03G 3/3005 |
| 2021/0125619 A1* | 4/2021 | López Espejo | ......... | G10L 17/04 |
| 2021/0334568 A1* | 10/2021 | Hall | .................... | G06V 40/1388 |
| 2021/0377176 A1* | 12/2021 | Chavan | .................. | H04L 69/22 |
| 2022/0188556 A1* | 6/2022 | Cho | ......................... | G06V 10/82 |
| 2022/0284212 A1* | 9/2022 | Pallerla | .................. | G06V 40/67 |
| 2022/0318354 A1* | 10/2022 | Park | .................... | G06V 40/1382 |
| 2022/0318376 A1* | 10/2022 | Cho | ....................... | G06V 10/82 |
| 2023/0030937 A1* | 2/2023 | Lee | ........................ | G06V 10/82 |
| 2023/0094656 A1* | 3/2023 | Mukherjee | .......... | H04L 63/1433 |
| | | | | 455/410 |

FOREIGN PATENT DOCUMENTS

| | | | | |
|---|---|---|---|---|
| EP | 1901239 A2 * | 3/2008 | ......... | G06K 9/00885 |
| EP | 1901239 A2 | 3/2008 | | |
| WO | 2014040124 A1 | 3/2014 | | |
| WO | WO-2014040124 A1 * | 3/2014 | ........... | G06F 16/683 |
| WO | WO-2020007495 A1 * | 1/2020 | ............. | G06F 21/32 |

\* cited by examiner

AUTHENTICATING A USER

CROSS-REFERENCE TO RELATED APPLICATIONS

This application relates to and claims the benefit and priority to International Application No. PCT/EP2018/072918, filed Aug. 24, 2018, which relates to and claims the benefit and priority to European Patent Application No. EP18382505.8 filed Jul. 6, 2018.

TECHNICAL FIELD

The present disclosure relates to methods of authenticating a user or speaker, and to computer programs, systems and computing systems suitable for performing said methods.

BACKGROUND

Voice biometrics is a technology that allows automatically identifying or verifying the identity of a person by means of her/his voice. This technology is based on the use of the so-called voiceprint, which can be defined, similarly to fingerprint, as a personal (i.e., unique) pattern extracted from a speech signal of a particular speaker.

Voice biometrics has progressed more or less significantly in the recent years, but voice biometrics is still far from being a mature technology. A number of issues condition its performance and prevent from a wider deployment of this technology, especially in those environments where an outstanding accuracy is required because of security reasons (e.g., in the banking sector). Different categories of factors that affect the performance of a voice biometrics system in an adverse manner are identified, such as e.g., variability factors, spoofing attacks, etc.

It is generally accepted that variability factors provoke that every speech sample is different, even if a same speaker records twice the same utterance by using the same device at the same place. Of course, differences further increase in case of different recording scenarios and, therefore, voiceprints from a same speaker result to be different from each other. This fact may compromise the performance of a voice biometrics system if there is mismatch between e.g., training, enrolment and identification/verification conditions, and this may provoke insufficient reliability and/or efficiency.

Regarding spoofing attacks, it is also accepted that current voice biometrics technology is likely to fail against malicious attacks based on identity spoofing. Far from being solved, this problem requires the research and development of techniques that strengthen the voice biometrics systems.

The above factors increase the false acceptance rate of the voice biometrics systems, thereby decreasing their security. Those speech utterances yielding false acceptances as a result of variability factors are known as zero-effort impostor speech utterances. On the other hand, spoofing speech utterances are those resulting from using a particular spoofing method with fraudulent purposes. Different techniques try to deal with the aforementioned variety of factors, but the development of a highly robust and secure voice biometrics system still poses a challenge and, therefore, is an open problem.

An object of the present disclosure is to provide methods, computer programs, systems and computing systems for authenticating a user or speaker that improve reliability and/or efficiency of current user authentication proposals.

SUMMARY

In an aspect, a method of authenticating a user or speaker is provided. The method comprises obtaining an input speech signal and user credentials identifying the user or speaker. The input speech signal includes a single-channel speech signal or a multi-channel speech signal. The method further comprises extracting a speech voiceprint from the input speech signal, and retrieving a reference voiceprint associated to the user credentials. The method still further comprises determining a voiceprint correspondence between the speech voiceprint and the reference voiceprint, and authenticating the user depending on said voiceprint correspondence. The method yet further comprises updating the reference voiceprint depending on the speech voiceprint corresponding to the authenticated user.

The proposed method is based on a reference voiceprint acting as a model of the user or speaker to be authenticated. In particular, a speech voiceprint is extracted from a previously obtained input speech signal and said speech voiceprint is compared to the reference/model voiceprint to determine a correspondence (or similarity) between them. If the correspondence between speech and reference voiceprints is acceptable (i.e., the voiceprints are acceptably similar to each other), the authentication may result successful and, otherwise, the authentication may result unsuccessful. Furthermore to the authentication itself, the reference voiceprint is kept up-to-date and improved by updating it depending on the speech voiceprint that has caused successful authentication.

It is thus provided a powerful way of authenticating a user or speaker under a recursive approach based on continuously refining the reference (or model) voiceprint throughout the authentications tried by the user over time. The term recursive is used herein to express the fact that each execution of the method does not only cause the authentication of the user, but furthermore the reference voiceprint is recursively tuned or refined. The reference/model voiceprint is recurrently evolved so that the influence of e.g., variability factors is reduced and, therefore, reliability and efficiency are better ensured.

The proposed approach is able to deal with e.g., intra-speaker variability as a result of ageing, disease, mood and other factors so, as time goes by (i.e., after successive authentications), every granted speaker/user is better characterized by a more robust and discriminative reference/model voiceprint. Therefore, by following this approach, a verification decision (i.e., whether a user is a granted speaker or an impostor) made more reliably as the decision likelihoods tend to increase and decrease in case of granted speakers and impostors, respectively.

In a further aspect, a computer program is provided comprising program instructions for causing a computing system to perform the previous method of (recursively) authenticating a user or speaker. This computer program may be embodied on a storage medium and/or carried on a carrier signal. Since this computer program is suitable for performing the above authentication method, same or similar principles and advantages as those commented with respect to the method may be attributed to this computer program.

In a still further aspect, a computing system is provided for (recursively) authenticating a user or speaker, the (authentication) computing system comprising a memory and a processor, embodying instructions stored in the memory and executable by the processor, the instructions comprising functionality to execute the previous method of (recursively)

authenticating a user or speaker. Since this (authentication) computing system is suitable for performing the above authentication method, same or similar principles and advantages as those commented with respect to the method may be attributed to this computing system.

In a yet further aspect, a system is provided for (recursively) authenticating a user or speaker. This (authentication) system comprises an obtaining module, an extraction module, a retrieving module, a correspondence module, an authentication module and an updating module. The obtaining module is configured to obtain an input speech signal and user credentials identifying the user or speaker, the input speech signal including a single-channel speech signal or a multi-channel speech signal. The extraction module is configured to extract a speech voiceprint from the input speech signal. The retrieving module is configured to retrieve a reference voiceprint associated to the user credentials. The correspondence module is configured to determine a voiceprint correspondence between the speech voiceprint and the reference voiceprint. The authentication module is configured to authenticate the user depending on the voiceprint correspondence. The updating module is configured to update the reference voiceprint depending on the speech voiceprint corresponding to the authenticated user. Since this system is suitable for performing the above authentication method, same or similar principles and advantages as those commented with respect to the method may be attributed to this (authentication) system.

In some examples, an online banking system may be provided which may be configured to authorize a user to perform one or more banking functionalities in the online banking system depending on a user authentication performed by any of the authentication (computing) systems described before. These banking functionalities may include e.g. access to the banking system, with full or partial read permission, with full or partial update permission, with full or partial functional permission, etc. The authentication (computing) system may be instructed by the online banking system to perform a more or less strong user authentication depending on whether the requested banking functionalities are more or less critical. The authentication (computing) system may be or not be comprised in the online banking system.

These and other advantages and features will become apparent in view of the detailed description and drawings.

BRIEF DESCRIPTION OF THE DRAWINGS

Non-limiting examples of the present disclosure will be described in the following, with reference to the appended drawings, in which.

DETAILED DESCRIPTION

For reasons of completeness, references to prior art disclosures are included in the following descriptions so as to provide the skilled person with detailed information for implementing any of the examples described herein. These prior art disclosures are listed at the end of this section of detailed descriptions, each of said disclosures being labelled with an identifier [NN . . . Nyy] wherein NN . . . N indicates a main, representative author of the disclosure and yy indicates the year of the disclosure. Such prior art disclosures are referred to in the following detailed descriptions through said labels/identifiers.

Figure 1:
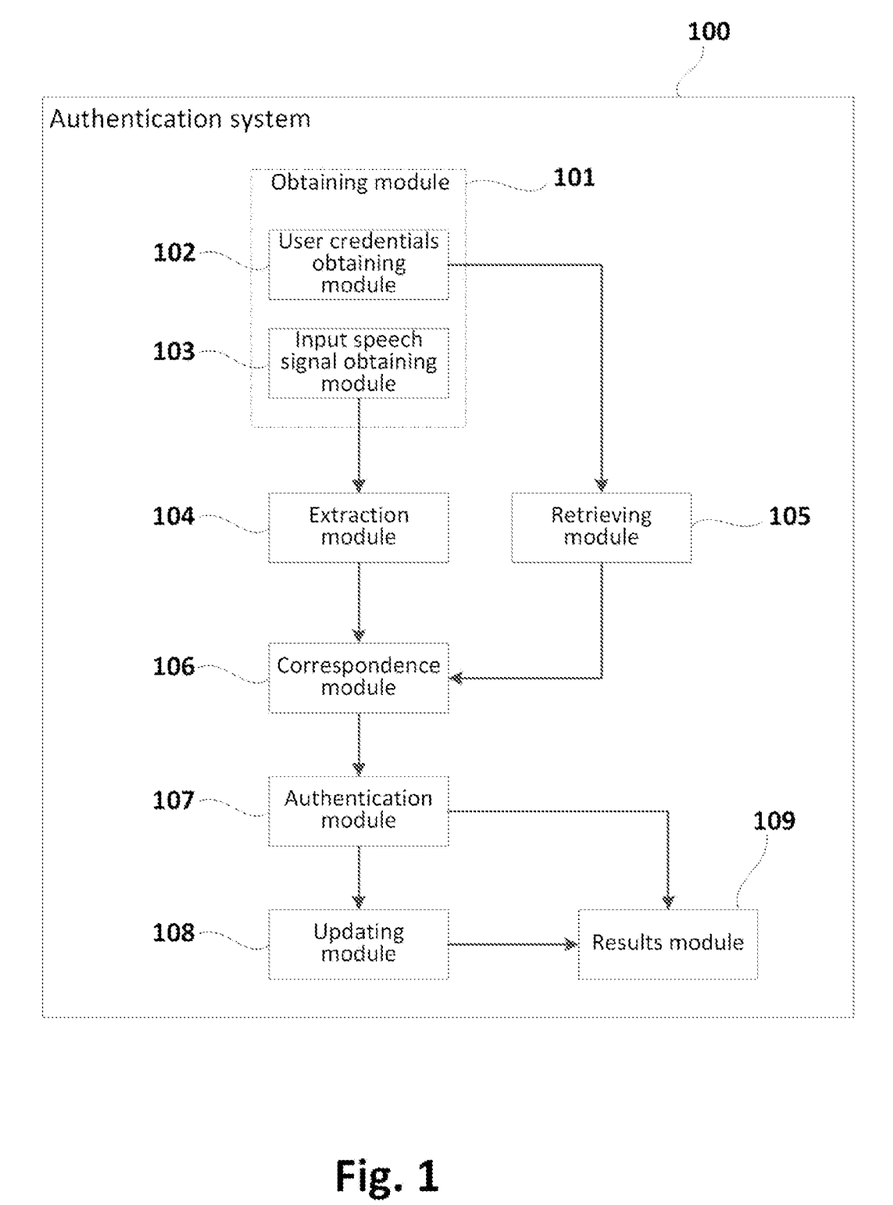
FIG. 1 is a block diagram schematically illustrating systems for authenticating a user or speaker according to examples.

FIG. 1 is a block diagram schematically illustrating systems 100 for authenticating a user or speaker according to examples. As shown in the figure, an authentication (computing) system according to present disclosure may comprise an obtaining module 101, an extraction module 104, a retrieving module 105, a correspondence module 106, an authentication module 107 and an updating module 108. Systems 100 according to FIG. 1 may further comprise a results module 109.

The obtaining module 101 may be configured to obtain an input speech signal and user credentials identifying the user or speaker, the input speech signal including a single-channel speech signal or a multi-channel speech signal. In some examples, the obtaining module 101 may comprise a user credentials obtaining (sub-) module 102 configured to obtain the user credentials, and an input speech signal obtaining (sub-) module 103 configured to obtain the input speech signal.

The input speech signal obtaining (sub-) module 103 may comprise an audio capturing sensor that may be internal or external to a capturing device. The audio capturing sensor may be any type of sensor suitable for recording a speech signal including or encoding a speech of the user or speaker to be authenticated. The capturing device may be internal or external to the authentication system 100, and may be implemented (or configured) to capture audios in e.g., digital format. To this end, the capturing device may comprise any suitable capturing sensor such as e.g., audio microphone(s). The input speech signal obtaining (sub-) module 103 may be configured to obtain or receive, from e.g., a combination of the cited capturing sensor(s) and capturing device(s), one or more audio captures and to provide said capture(s) to the extraction module 104. Functional details about the input speech signal obtaining (sub-) module 103 are provided in other parts of the description, especially with reference to FIGS. 3 and 4.

The extraction module 104 may be configured to extract a speech voiceprint from the input speech signal obtained (or received) at the obtaining module 101. The retrieving module 105 may be configured to retrieve a reference voiceprint associated to the user credentials obtained at the obtaining module 101. Functional details about the extraction module 104 and the retrieving module 105 are provided in other parts of the description, especially with reference to FIGS. 3 and 4.

The correspondence module 106 may be configured to determine a (voiceprint) correspondence between the speech voiceprint (extracted at extraction module 104) and the reference voiceprint (retrieved at retrieving module 105). The authentication module 107 may be configured to authenticate the user depending on said correspondence between voiceprints (determined at correspondence module 106). The updating module 108 may be configured to update the reference voiceprint depending on the speech voiceprint corresponding to the user authenticated at authentication module 107. The results module 109 may be configured to provide authentication results, such as e.g., whether the user or speaker has been authenticated successfully or unsuccessfully, whether the reference voiceprint has been updated successfully or unsuccessfully, etc. Functional details about these modules 106, 107, 108, 109 are provided in other parts of the description, especially with reference to FIGS. 3 and 4.

Figure 2:
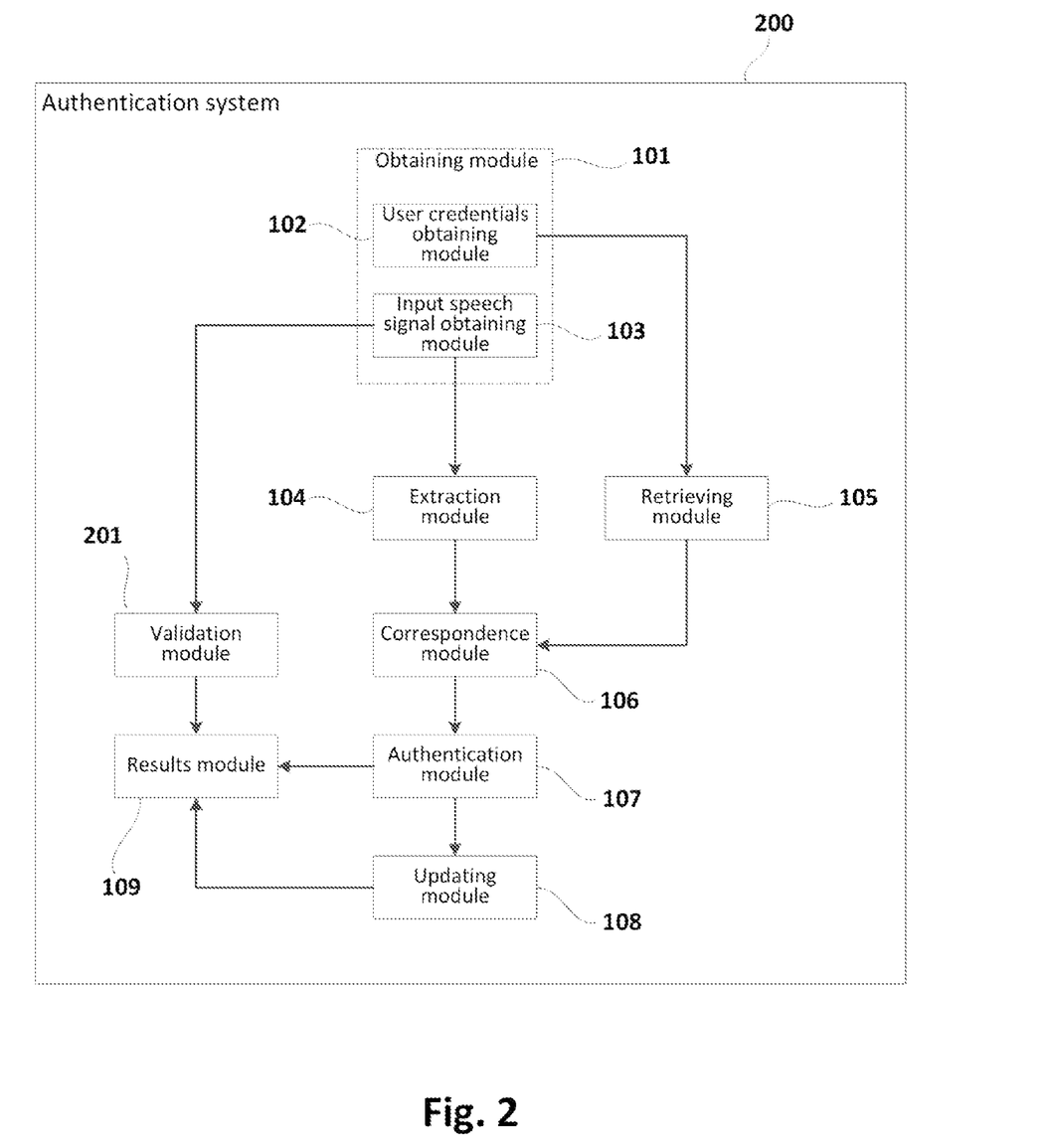
FIG. 2 is a block diagram schematically illustrating systems for authenticating a user or speaker according to further examples.

FIG. 2 is a block diagram schematically illustrating systems 200 for authenticating a user or speaker according to further examples. These systems 200 may be similar to those described with reference to FIG. 1. In particular, systems according to FIG. 2 may comprise an obtaining module 101, extraction module 104, retrieving module 105, correspondence module 106, authentication module 107, updating module 108, results module 109, etc., which may be similar or coincident to those of FIG. 1. Same number references from FIG. 1 are re-used to refer to said similar or coincident modules in FIG. 2.

A difference may reside in validation module 201 which is not included in systems according to FIG. 1. The validation module 201 may be configured to determine, based on predefined signal-validity criteria, whether the input speech signal (from the obtaining module 101) is valid or not, and to transfer corresponding signal-validity data to the results module 109. These signal-validity data may provoke the results module 109 to produce e.g., a warning of possible false authentication result(s) if non-acceptable validity of the input speech signal has been determined. Functional details about the validation module 201 and how signal-validity data may be processed by e.g., the results module 109 are provided in other parts of the description, especially with reference to FIGS. 3 and 4.

As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Moreover, the modules may be implemented across multiple devices (associated or linked to the authentication system 100, 200) and/or other components that may be local or remote to one another. Additionally, the modules may be moved from one device and added to another device, and/or may be included in both devices (associated to the authentication system 100, 200). Any software implementations may be tangibly embodied in one or more storage media, such as e.g., a memory device, a floppy disk, a compact disk (CD), a digital versatile disk (DVD), or other devices that may store computer code.

Any authentication (computing) system 100, 200 according to present disclosure may be implemented by computing means, electronic means or a combination thereof. The computing means may be a set of instructions (that is, a computer program) and then the authentication (computing) system 100, 200 may comprise a memory and a processor, embodying said set of instructions stored in the memory and executable by the processor. The instructions may comprise functionality to execute authentication methods such as e.g., the ones described with reference to FIGS. 3 and 4.

In case the authentication (computing) system 100, 200 is implemented only by electronic means, a controller of the system 100, 200 may be, for example, a CPLD (Complex Programmable Logic Device), an FPGA (Field Programmable Gate Array) or an ASIC (Application-Specific Integrated Circuit).

Figure 3:
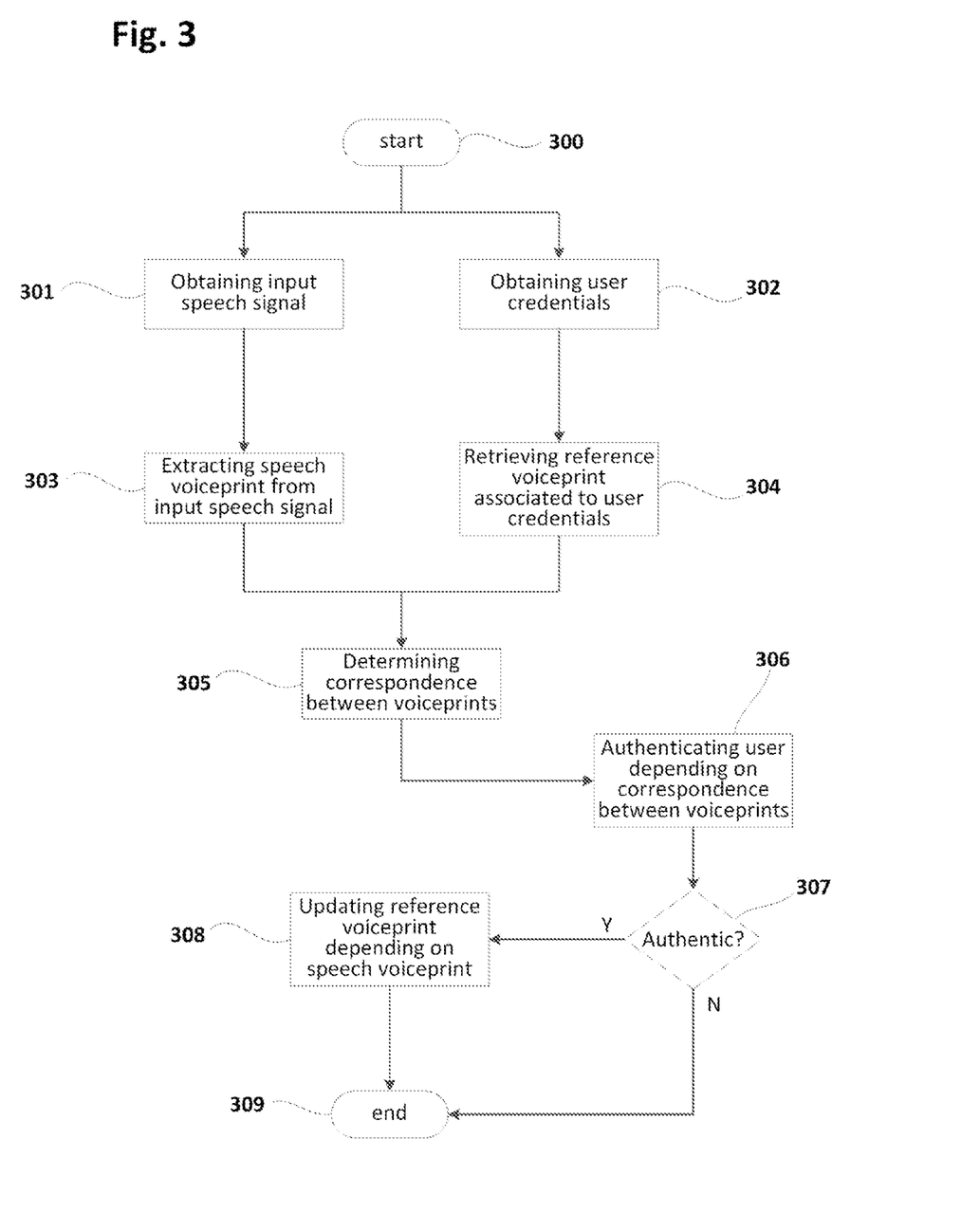
FIG. 3 is a flow chart schematically illustrating methods of authenticating a user or speaker according to examples.
Figure 4:
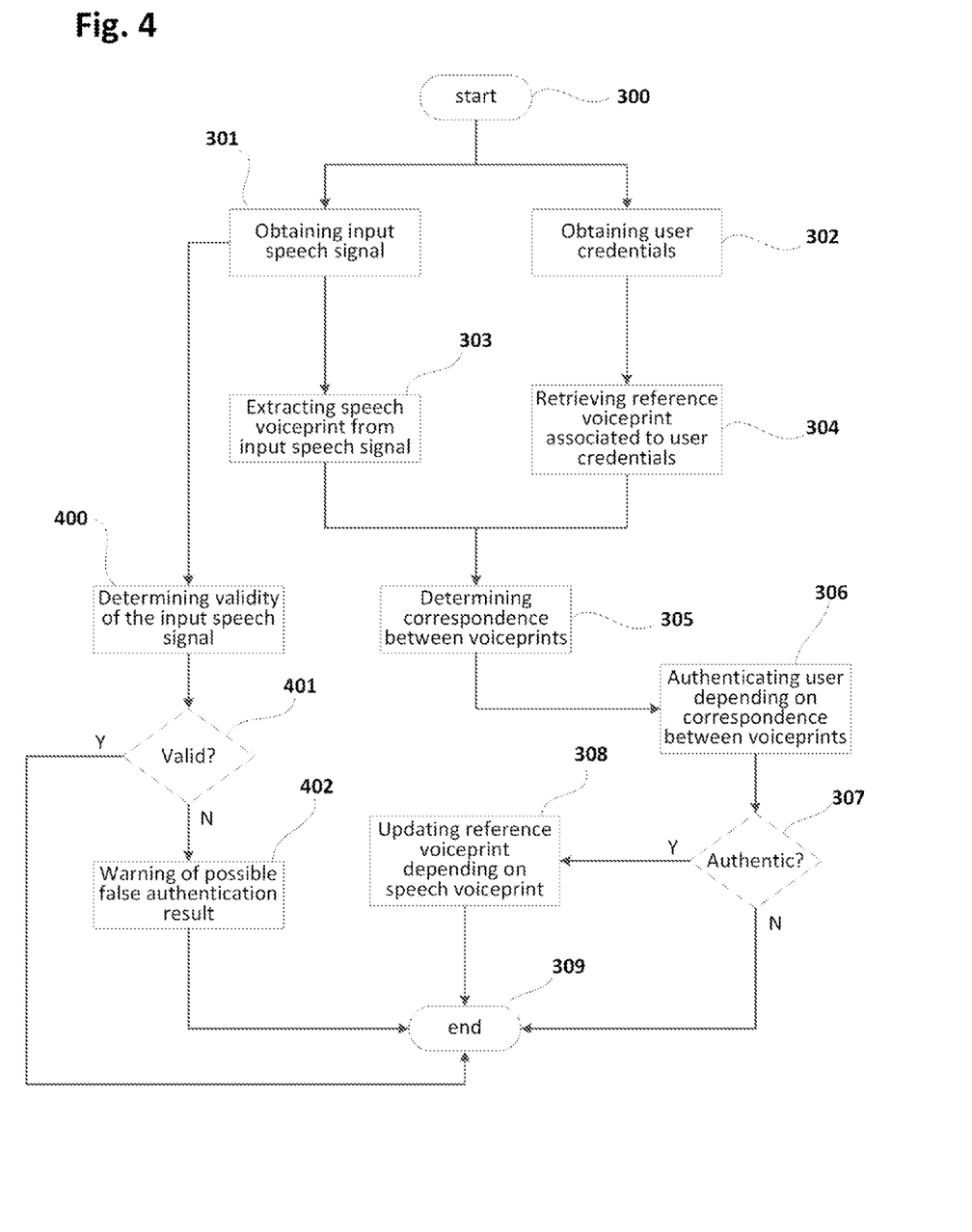
FIG. 4 is a flow chart schematically illustrating methods of authenticating a user or speaker according to further examples.

In case the authentication (computing) system 100, 200 is a combination of electronic and computing means, the computing means may be a set of instructions (e.g., a computer program) and the electronic means may be any electronic circuit capable of implementing the corresponding method steps of the proposed authentication methods (according to e.g., FIGS. 3 and 4).

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of authentication methods according to e.g., FIGS. 3 and 4. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means. Alternatively, the carrier may be an integrated circuit in which the computer program is embedded, the integrated circuit being adapted for performing, or for use in the performance of, the relevant methods.

In any of the authentication (computing) systems 100, 200 described herein, all the modules of the system may be comprised in a computing server (e.g., cloud server), and the obtaining module 101 may be configured to receive the input speech signal and user credentials from a user device (e.g., portable device) through a connection (e.g., Internet based connection) between the computing server and the user device. In alternative configurations, only some of the modules of the authentication system 100, 200 may be comprised in computing (cloud) server and remaining modules of the system may be comprised in user (portable) device configured to capture the input speech signal and user credentials. A particular module may be included in either the computing (cloud) server or the user (portable) device depending on computational load predicted or estimated for said module. Good balance between computational load in computing server and computational load in user device may thus be achieved, such that efficiency of the whole authentication system 100, 200 may be generally optimized.

According to examples, an online banking system may be provided which may be configured to authorize a user to perform (certain) banking functionalities in the banking system depending on a user authentication performed by an authentication system 100, 200 such as the ones described herein. The online banking system may or may not include the authentication system 100, 200.

FIG. 3 is a flow chart schematically illustrating methods of authenticating a user or speaker according to examples. These authentication methods may be performed by authentication systems according to e.g., FIG. 1 or 2. Number references from FIG. 1 or 2 may be re-used in following description of FIG. 3 for the sake of better understanding.

At initial block 300, the authentication method may be initiated as a result of (detecting) a starting condition such as e.g., activation of authentication functionality, attempt to access sensible information, attempt to run an app requiring user authentication, etc.

At block 301, an input speech signal may be obtained (or received) from the user or speaker to be authenticated. The input speech signal may be either a single-channel speech signal or a multi-channel speech signal. This functionality may be performed by e.g., the input speech signal obtaining (sub-) module 103 included in the obtaining module 101.

At block 302, user credentials identifying the user or speaker to be authenticated may be obtained. The user credentials may comprise any kind of data identifying the user or speaker to be authenticated, such as e.g., a username, an internal identifier, username and password, etc. This functionality may be performed by e.g., the user credentials obtaining (sub-) module 102 included in the obtaining module 101.

At block 303, a speech voiceprint may be extracted from the input speech signal that has been obtained at block 301. The speech voiceprint may include acoustic feature vectors representative of the user or speaker to be authenticated such as i-vectors, x-vectors, etc. This functionality may be performed by e.g., the extraction module 104.

At block 304, a reference voiceprint associated to the user credentials may be retrieved from e.g., a repository of predefined voiceprints of reference. This repository may comprise e.g., a database, a file system, or any other type of storing application configured to store voiceprints and their association with corresponding users (to be authenticated). This functionality may be performed by e.g., the retrieving module 105 with respect to which the voiceprint repository may be either internal or external. The underlying representation (or format or implementation) of the reference voiceprint may be compatible with the speech voiceprint such that they may be compared to each other in next block 305.

At block 305, a correspondence between the speech voiceprint and the reference voiceprint may be determined or calculated. The correspondence between the speech and the reference voiceprints may be determined or calculated using e.g., cosine distance, probabilistic linear discriminant analysis (PLDA), support vector machines (SVMs), deep neural networks (DNNs), etc. The higher the correspondence (or matching degree), the more similar may be considered the speech and reference voiceprints to each other. The lower the correspondence (or matching degree), the less similar may be considered the speech and reference voiceprints to each other. In other words, the similarity between the speech and reference voiceprints may be promoted or demoted proportionally to the correspondence (or matching degree) between the speech and the reference voiceprints. This functionality may be performed by e.g., the correspondence module 106.

At block 306, the user may be authenticated depending on the correspondence between voiceprints determined at previous block 305. The higher the similarity between the speech and reference voiceprints, the higher may be the possibilities of successful authentication of the user. The lower the similarity between the speech and reference voiceprints, the lower may be the possibilities of successful authentication of the user. In other words, the possibilities of successful authentication may be promoted or demoted proportionally to the similarity between the speech and reference voiceprints. The voiceprint correspondence (or similarity) from block 305 may be e.g., compared to a predefined correspondence threshold. In the case that the voiceprint correspondence is higher than the predefined correspondence threshold, the user may be determined as successfully authenticated and, otherwise, as unsuccessfully authenticated. A score calibration $\sigma(x)$ of the authentication may be also performed at block 306, wherein x represents a score of the authentication. The closer to 1 is $\sigma(x)$, the more successful may be qualified the authentication, and the closer to 0 is $\sigma(x)$, the less successful may be qualified the authentication. The score calibration $\sigma(x)$ may be e.g., a sigmoid calibration. The score x may be determined by e.g., a classifier trained to determine the score x of the speech voiceprint $v_t^{(s')}$, representing the input speech signal of speaker s' at time t, against the reference voiceprint $e_{t-1}^{(s)}$ of speaker s at past time t−1. If the speaker of the speech signal and of reference signal result to be the same speaker (s'=s), it means legitimate trial and, otherwise (s'≠s), fraudulent trial. These "authentication" functionalities may be performed by e.g., the authentication module 107.

At block 307, a decision step may be performed depending on whether the user has been (successfully or unsuccessfully) authenticated at previous block 306. In some examples, this decision may further depend on whether the score calibration $\sigma(x)$ is above or not above a predefined calibration threshold $\Psi$. In the case that $\sigma(x)$ is not greater than $\Psi$, it may denote that the result of the updating $e_t^{(s)}$ is (expected or estimated) to be equal to the reference voiceprint to be updated $e_{t-1}^{(s)}$. If the user has been (successfully) authenticated (and optionally $\sigma(x)>\Psi$), a transition to block 308 may be performed to update the reference voiceprint depending on the speech voiceprint that has caused the (successful) authentication of the user. Otherwise, the method may continue to end block 309 for ending the execution of the method by e.g., emitting a warning indicating that the user cannot be authenticated (or unsuccessful authentication of the user) due to insufficient correspondence between speech and reference voiceprints (and/or optionally unacceptable score calibration). This "decision" functionality may be performed by e.g., the authentication module 107.

At block 308, the reference voiceprint may be updated depending on the speech voiceprint corresponding to the authenticated user. If the user has been successfully authenticated (at block 306), the reference voiceprint may be updated taking into account the speech voiceprint of the (successfully) authenticated user. This way, the reference voiceprint of the user may be kept up-to-date and improved in the sense that the reference voiceprint is increasingly representative of the user or speaker as new authentications are performed. The updating of the reference voiceprint may be performed based on the following formula:

$$e_t^{(s)} = \lambda(\sigma(x),\Psi,y)e_{t-1}^{(s)} + (1-\lambda(\sigma(x),\Psi,y))v_t^{(s')}$$

wherein $e_t^{(s)}$ corresponds to the updated reference voiceprint, $e_{t-1}^{(s)}$ corresponds to the reference voiceprint to be updated, $v_t^{(s')}$ corresponds to the speech voiceprint, and $\lambda(\sigma(x), \Psi, y)$ corresponds to a remembering factor balancing a relative importance of $e_{t-1}^{(s)}$ and $v_t^{(s')}$ in the updating. These "updating" functionalities may be performed by e.g., the updating module 108.

The remembering factor $\lambda(\sigma(x),\Psi,\gamma)$ may be a truncated monotonic decreasing linear function. In particular, the remembering factor $\lambda(\sigma(x),\Psi,\gamma)$ may be determined based on the following formula:

$$\lambda(\sigma(x), \Psi, \gamma) = \max\left(\frac{(\gamma-1)\sigma(x) + \gamma(1-\Psi)}{\gamma-\Psi}, \gamma\right)$$

wherein α is a predefined heuristic factor indicating a minimum importance of $e_{t-1}^{(s)}$ in the updating. The predefined calibration threshold Ψ may be, in some implementations, less than the predefined heuristic factor γ.

In some examples, maximum importance may be attributed to the speech voiceprint $v_t^{(s')}$ representing the input speech signal in the updating of the reference voiceprint. This may be implemented by forcing or causing the score calibration σ(x) to be not less than the predefined heuristic factor γ and the remembering factor λ(σ(x), Ψ, γ) to be equal to γ. In this case, the updating of the reference voiceprint may thus be performed based on the following formula:

$$e_t^{(s)} = v_t^{(s')} + \gamma(e_{t-1}^{(s)} - v_t^{(s')})$$

In alternative examples, an importance may be attributed to the speech voiceprint $v_t^{(s)}$ that linearly increases as the score calibration σ(x) is closer to the predefined heuristic factor γ. This may be implemented by forcing or causing the score calibration σ(x) to lie between the predefined calibration threshold Ψ and the predefined heuristic factor γ, and the remembering factor λ(σ(x),Ψ,γ) to be equal to $$\frac{(\gamma - 1)\sigma(x) + \gamma(1 - \Psi)}{\gamma - \Psi}$$

In this case, the updating of the reference voiceprint may thus be performed based on following formula:

$$e_t^{(s)} = \frac{(\gamma - 1)\sigma(x) + \gamma(1 - \Psi)}{\gamma - \Psi} e_{t-1}^{(s)} + \left(1 - \frac{(\gamma - 1)\sigma(x) + \gamma(1 - \Psi)}{\gamma - \Psi}\right) v_t^{(s')}$$

At block 309, the authentication method may be terminated by e.g., providing authentication and/or updating results, emitting warnings due to anomalous authentication, freeing volatile memory, switching the authentication functionality to standby state, etc. Such a provision of results, warnings, messages, etc., may be performed by e.g., the results module 109.

FIG. 4 is a flow chart schematically illustrating methods of authenticating a user or speaker according to further examples. These methods may be similar to those described with reference to FIG. 3. In particular, methods according to FIG. 4 may comprise obtaining blocks 301, 302, extracting block 303, retrieving block 304, correspondence block 305, authenticating block 306, authenticity decision block 307, updating block 308, ending block 309, etc., which may be similar or coincident to those of FIG. 3. Same number references from FIG. 3 are re-used to refer to said similar or coincident modules in FIG. 4.

Some differences may reside in validation block 400, validity decision block 401 and warning block 402 which are not included in methods according to FIG. 3. Authentication methods according to FIG. 4 may be performed by authentication systems according to e.g., FIG. 2. Number references from FIG. 2 may be re-used in following description of FIG. 4 for the sake of better understanding.

At block 400, validity of the input speech signal may be determined based on e.g., predefined signal-validity criteria. The predefined signal-validity criteria may include predefined signal-quality criteria and/or predefined spoofing-detection criteria. This "validity" function may be performed by e.g., the validation module 201 of FIG. 2.

At block 401, a decision step may be performed depending on whether the input speech signal has been determined as valid or invalid at previous block 400. If validity of the input speech signal has been confirmed at block 400, a transition to end block 309 may be performed for ending the execution of the method taking into account that the input speech signal is acceptably reliable. Otherwise, the method may continue to block 402 for producing a warning of possible false authentication result due to unacceptable reliability. If validity of the input speech signal is above a predefined validity threshold, the input speech signal may be considered as acceptably reliable and, otherwise, the input speech signal may be considered as unreliable (i.e., with unacceptable reliability). This "decisional" function may be performed by e.g., the validation module 201.

At block 402, a warning may be produced denoting possible false authentication of the user or speaker due to non-reliability of the input speech signal in terms of e.g., insufficient signal quality and/or excessive spoofing indicia. This "warning" function may be performed by e.g., the validation module 201, also.

The ending block 309 may finally provide authentication, validity and/or updating results to e.g., the user who is trying his/her authentication, a competent operator of the system, etc. These results may be shown on e.g., a display or any other output device suitable for that. If successful user authentication has been determined (at block 306) and warning of possible false authentication result has not been produced (at block 402) a "full authentication" message may be displayed. If successful user authentication has been determined and warning of possible false authentication result has been produced, a "revisable authentication" message may be displayed. If unsuccessful user authentication has been determined and warning of possible false authentication result has not been produced, a "full failed authentication" message may be displayed. If unsuccessful user authentication has been determined and warning of possible false authentication result has been produced, a "revisable failed authentication" message may be displayed. The "revisable authentication" message may denote that the user has been authenticated but with low reliability of the speech signal, and the "revisable failed authentication" message may denote that the user has been determined as non-authentic but with low reliability of the input speech signal. In both cases, the "revisable" messages may be addressed to competent staff for monitoring and/or correction of the authentication result(s).

The aforementioned signal-validity criteria may define a series of signal-quality conditions to be satisfied by the input speech signal. In particular, the validity of the input speech signal may depend on a signal-quality index of the input speech signal determined depending on signal-quality feature(s) detected or extracted from the input speech signal. As a general principle, if the signal-quality features produce a signal-quality index denoting acceptable quality of the input speech signal, it may be determined as valid and, otherwise, as non-valid signal. The signal-quality index may be determined as denoting acceptable quality if e.g., the signal-quality index is above a predefined signal-quality threshold and, otherwise, as denoting unacceptable quality. The higher the signal-quality index, the higher the validity of the input speech signal may be determined, whereas the lower the signal-quality index, the lower the validity of the input speech signal may be determined. In other words, the validity of the input speech signal may be promoted or demoted proportionally to the signal-quality index.

The aforementioned spoofing-detection criteria may define a series of spoofing-detection conditions to be satisfied by the input speech signal. In particular, the validity of the input speech signal may depend on a spoofing index of the input speech signal determined depending on spoofing-related feature(s) detected or extracted from the input speech signal. As a general approach, if the spoofing-related features produce a spoofing index indicating acceptable spoofing indicia of the input speech signal, it may be determined as valid signal and, otherwise, as non-valid signal. The spoofing index may be determined as indicating acceptable spoofing indicia if e.g., the spoofing index is below a predefined spoofing threshold (i.e., spoofing indicia are negligible) and, otherwise, as denoting unacceptable spoofing indicia (i.e., spoofing indicia are excessive to discard spoofing in the speech signal). The higher the spoofing index, the lower the validity of the input speech signal may be determined, whereas the lower the spoofing index, the higher the validity of the input speech signal may be determined. In other words, the validity of the input speech signal may be promoted or demoted inversely proportionally to the spoofing index.

Determining the signal-quality feature(s) may comprise e.g., determining whether the input speech signal includes a single user or speaker voice or several user or speaker voices. If the input speech signal includes a single user or speaker voice, the signal-quality index may be determined higher so as to indicate a better quality of the input speech signal in comparison with the case of including several user or speaker voices. Otherwise (i.e., several user voices are included) the signal-quality index may be determined lower so as to indicate a worse quality of the input speech signal. The determination of whether the input speech signal includes a single user voice or several user or speaker voices may be based on any known technique aimed at that, such as e.g., blind speaker clustering (see e.g., [Iyer06] for more detailed information).

Additionally or alternatively, determining the signal-quality feature(s) may comprise determining first channel feature(s) from the input speech signal and second channel feature(s) associated to the user credentials, and determining corresponding channel difference(s) between the first and second channel feature(s). Then, the signal-quality index may be refined or adjusted depending on the determined channel difference(s). For example, the higher the channel difference(s), the lower the signal-quality index may be determined, whereas the lower the channel difference(s), the higher the signal-quality index may be determined. In other words, the signal-quality index may be promoted or demoted inversely proportionally to the channel difference(s). The second channel feature(s) associated to the user credentials may be pre-calculated and stored in e.g., the aforementioned repository of reference voiceprints or similar storage support. So the determination of said second channel feature(s) may simply include retrieving them from said repository. The determination of the first channel feature(s) from the input speech signal may be performed from any known technique aimed at that. For example, the determination of the first channel feature(s) may comprise analysing an offset component of the input speech signal at log-Mel or cepstral domains (see e.g., [Gaubitch13] for more detailed information). The determination of the channel difference(s) may comprise any technique purposed at this end, such as e.g., measuring a Euclidean distance or a cosine distance between the first and second channel feature(s).

Additionally or alternatively, determining the signal-quality feature(s) may comprise determining a background noise level. The background noise level may be determined by applying any known technique with said purpose or similar, such as e.g., a signal-to-noise ratio (SNR)-based technique. Applying the signal-to-noise ratio (SNR)-based technique may comprise e.g., determining a signal-to-noise ratio based on maximum-likelihood estimation depending on an estimated acoustic noise (see e.g., [Ephraim85]) and/or any other approach with same or similar aim(s). The estimation of the acoustic noise may be based on e.g., minimum statistics (see e.g., [Martin01]) and/or a multi-channel deep neural network-based technique (see e.g., [López16]) and/or any other known technique aimed at same or similar end(s). The determination of the background noise level may (further or alternatively) comprise comparing a first audio segment in the input speech signal without user or speaker voice and a second audio segment in the input speech signal with user or speaker voice. The higher the background noise level the lower the signal-quality index may be determined, whereas the lower the background noise level the higher the signal-quality index may be determined. In other words, the signal-quality index may be promoted or demoted inversely proportionally to the background noise level.

Additionally or alternatively, determining the signal-quality feature(s) may comprise identifying a language from a user or speaker voice in the input speech signal. The identification of the language in the input speech signal may be based on any known technique with said aim or similar, such as e.g., using i-vectors and probabilistic linear discriminant analysis (PLDA) (see e.g., [Rai16] for more detailed information) or x-vectors (see e.g., [Snyder18]). The signal-quality index may be determined higher if the identified language is allowable, whereas the signal-quality index may be determined lower if the identified language is not allowable. The identified language may be considered allowable if e.g., said language corresponds to a predefined language associated to the user credentials and, otherwise, the identified language may be considered not allowable. The predefined language associated to the user credentials may be pre-identified and stored in e.g., the aforementioned repository of reference voiceprints or similar storage support. So the determination of the predefined language may simply include retrieving it from said repository.

Additionally or alternatively, determining the signal-quality feature(s) may comprise identifying an utterance from a user or speaker voice in the input speech signal through e.g., an automatic speech recognition technique, and determining an utterance correspondence between the identified utterance and a predefined utterance of reference. The automatic speech recognition technique may be based on e.g., one or more deep neural networks (DNNs) and, in some examples, may be additionally based on hidden Markov models (HMMs) (see e.g., [Hinton12] for more detailed information). In particular examples, corresponding user device may be instructed to request the user under authentication to utter the predefined utterance, for the user device to capture said utterance as (or included in) the input speech signal. The predefined utterance may be e.g., an utterance of reference associated to the user credentials, which may be stored in e.g., the aforementioned repository of reference voiceprints or similar storage support. The utterance correspondence may be text-dependent or text-independent. Text-dependent correspondence may comprise e.g., a word correspondence between words included in the identified utterance and words included in the predefined utterance. Text-independent correspondence may comprise e.g., a phonetic correspondence between phonetic content in the identified utterance and phonetic content in the predefined utterance. The higher the utterance correspondence, the higher the signal-quality index may be determined, whereas the lower the utterance correspondence, the lower the signal-quality index may be determined. In other words, the signal-quality index may be promoted or demoted proportionally to the utterance correspondence.

Additionally or alternatively, determining the signal-quality feature(s) may comprise determining or calculating duration of a user or speaker voice in the input speech signal and determining a duration correspondence between the determined duration and a predefined duration of reference. This reference duration may e.g., be associated to the user credentials and, in some examples, may be stored in the aforementioned repository of reference voiceprints or similar storage support. The determination of the duration of the user or speaker voice in the input speech signal may include applying any known technique or approach with said purpose or similar, such as e.g., a technique for detecting voice activity or speech duration based on DNNs (see e.g., [Zhang13] for more detailed information). The higher the duration correspondence, the higher the signal-quality index may be determined, while the lower the duration correspondence, the lower the signal-quality index may be determined. In other words, the signal-quality index may be promoted or demoted proportionally to the duration correspondence.

Additionally or alternatively, determining the signal-quality feature(s) may comprise determining an alcohol intoxication level from a user or speaker voice included in the input speech signal. The alcohol intoxication level may be determined based on any known technique with said purpose or similar, such as e.g., using prosodic speech characteristics (see e.g., [Levit01] for more detailed information). The higher the alcohol intoxication level, the lower the signal-quality index may be determined, while the lower the alcohol intoxication level, the higher the signal-quality index may be determined. In other words, the signal-quality index may be promoted or demoted inversely proportionally to the alcohol intoxication level.

Determining the spoofing-related feature(s) may comprise e.g., verifying whether the input speech signal includes an ultrasonic pseudorandom code corresponding to a predefined code of reference. The ultrasonic pseudorandom code may correspond to an ultrasonic signal not audible by a user in the range between 20 kHz and 22 kHz (something already manageable by current portable electronic devices, see e.g., [Filonenko10] for more detailed information), or to an ultrasonic signal not audible by a user with a frequency ranging over 22 kHz, in case the user device allows it. The ultrasonic pseudorandom code acts as a non-audible signature that can be used to legitimize the input audio. The presence or absence of this signature may be used to determine the spoofing index. The ultrasonic pseudorandom code and/or its existence in the input speech signal may be detected by applying any known technique aimed at that or similar end, such as e.g., a spectral analysis technique. The authentication method may comprise generating the ultrasonic pseudorandom code. The predefined code of reference may be an ultrasonic pseudorandom code associated to the user credentials, so it can be stored in the aforementioned repository of reference voiceprints or similar storage support. Corresponding user device may be instructed to play the (generated or retrieved) ultrasonic pseudorandom code during capture of the input speech signal by the user device, so as to cause inclusion of the ultrasonic pseudorandom code in the input speech signal. The spoofing index may be determined lower if the input speech signal includes the ultrasonic pseudorandom code, and the spoofing index may be determined higher if the input speech signal does not include the ultrasonic pseudorandom code.

Additionally or alternatively, determining the spoofing-related feature(s) may comprise determining (one or more) single-channel replay attack (i.e., playing a previously recorded user's speech signal using e.g., a loudspeaker) indicia by using any known technique aimed at that or similar purpose, such as e.g., a classifier of acoustic features based on support vector machines (SVMs) (see e.g., [Villalba11] for more detailed information). The more single-channel replay attack indicia, the higher the spoofing index may be determined, whereas the less single-channel replay attack indicia, the lower the spoofing index may be determined. In other words, the spoofing index may be promoted or demoted proportionally to the single-channel replay attack indicia. If no single-channel replay attack indicia are determined, no variation (promotion or demotion) of the spoofing index may be induced due to said spoofing-related feature(s).

Additionally or alternatively, determining the spoofing-related feature(s) may comprise determining (one or more) multi-channel replay attack indicia by using any known technique aimed at that or similar purpose. For example, the multi-channel replay attack indicia may be determined by calculating incidence relations of different microphones (used to capture the input speech signal) on single-channel components of the input speech signal. It is expected that said incidence relations measured for a genuine speaker will differ significantly from those incidence relations measured from a multi-channel replay attack, in which the recorded user's speech signal is replayed using e.g., a loudspeaker. Therefore, a trained classifier may be used to identify multi-channel replay attack indicia depending on said incidence relations. Calculating such incidence relations may comprise e.g., calculating relative channel responses between microphones based on a single-microphone blind channel identification method for speech based on using spectrum classification (see e.g., [Gaubitch11] for more detailed information). For instance, an N×N matrix H may be formed with relative channel responses between microphones $\{h_{ij}; i, j=1, \ldots, N\}$, wherein N is the total number of microphones available and $h_{ij}$ is the relative channel response between i-th and j-th microphone. Once generated, the whole or part of the matrix H may be inputted to the classifier trained to identify multi-channel replay attack indicia depending on said matrix. The classifier trained to identify multi-channel replay attack indicia may be based on e.g., support vector machines (SVMs). The more multi-channel replay attack indicia, the higher the spoofing index may be determined, and the less multi-channel replay attack indicia, the lower the spoofing index may be determined. In other words, the spoofing index may be promoted or demoted proportionally to the multi-channel replay attack indicia. If no multi-channel replay attack indicia are determined, no variation (promotion or demotion) of the spoofing index may be induced due to said spoofing-related feature(s).

Additionally or alternatively, determining the spoofing-related feature(s) may comprise determining magnetically-inferred replay attack indicia by verifying whether a magnetic field measurement from user device used to capture the input speech signal is above or below a predefined magnetic field threshold. The authentication method may comprise instructing the user device to obtain the magnetic field measurement through corresponding magnetometer(s) during capture of the input speech signal. It is expected that the device(s) used to replay the recorded user's speech signal in case of replay attack will generate a magnetic field that can be detected by the magnetometer(s) included in the user's device when both devices are close enough. Thus, the presence of a magnetic field stronger than the magnetic field measured when the genuine user records his/her voice may be used to identify replay attack. The magnetic field measurement from the user device may be averaged to obtain an average magnetic field measurement over time during capture of the input speech signal, and said average magnetic field measurement may be compared with the predefined magnetic field threshold to determine the magnetically-inferred replay attack indicia. The more magnetically-inferred replay attack indicia, the higher the spoofing index may be determined. The less magnetically-inferred replay attack indicia, the lower the spoofing index may be determined. In other words, the spoofing index may be promoted or demoted proportionally to the magnetically-inferred replay attack indicia. If no magnetically-inferred replay attack indicia are determined, no variation (promotion or demotion) of the spoofing index may be induced due to said spoofing-related feature(s).

In the different examples described herein, different predefined thresholds (or reference values) are used to identify special situations depending on e.g., a variable magnitude (measurement, index, etc.) which is compared with corresponding threshold. Examples of such predefined thresholds are the predefined correspondence threshold, calibration threshold, validity threshold, signal-quality threshold, spoofing threshold, magnetic field threshold, etc. Any of said predefined thresholds may have been pre-established by performing experiments to determine e.g., from which value the variable magnitude may indicate the targeted special situation. These experiments may have been based on e.g., calculations of test (or sample) data and corresponding validation by competent user to (continuously and/or regularly) refine or adjust the threshold. This refinement may be performed as many times as required along the life of corresponding method (and software/system) and possibly depending on results provided by the method itself. Some of these thresholds may correspond to the same or similar concept but they may have been differently denominated to differentiate them depending on corresponding functionality or context of application.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The following clauses disclose in a non-limiting way additional embodiments.

Clause 1. A method of authenticating a user or speaker, comprising:
  obtaining an input speech signal and user credentials identifying the user or speaker, the input speech signal including a single-channel or multi-channel speech signal;
  extracting a speech voiceprint from the input speech signal;
  retrieving a reference voiceprint associated to the user credentials;
  determining a voiceprint correspondence between the speech voiceprint and the reference voiceprint;
  authenticating the user or speaker depending on the voiceprint correspondence; and
  updating the reference voiceprint depending on the speech voiceprint corresponding to the authenticated user or speaker.

Clause 2. A method according to clause 1, wherein the user or speaker is authenticated depending on whether the voiceprint correspondence is above or below a predefined correspondence threshold.

Clause 3. A method according to any of clauses 1 or 2, further comprising determining validity of the input speech signal based on predefined signal-validity criteria.

Clause 4. A method according to clause 3, further comprising generating a warning of possible false authentication result if the validity of the input speech signal is below a predefined validity threshold.

Clause 5. A method according to any of clauses 3 or 4, wherein the predefined signal-validity criteria include predefined signal-quality criteria; and wherein determining the validity of the input speech signal comprises
  determining, based on the predefined signal-quality criteria, one or more signal-quality features in the input speech signal and a signal-quality index of the input speech signal depending on the one or more signal-quality features; and
  determining the validity of the input speech signal depending on the determined signal-quality index.

Clause 6. A method according to clause 5, wherein the higher the signal-quality index, the higher the validity of the input speech signal is determined; and the lower the signal-quality index, the lower the validity of the input speech signal is determined.

Clause 7. A method according to any of clauses 5 or 6, wherein determining the one or more signal-quality features comprises determining whether the input speech signal includes a single user or speaker voice or several user or speaker voices; and wherein
  the signal-quality index is determined higher if the input speech signal includes a single user or speaker voice, and lower if the input speech signal includes several user or speaker voices.

Clause 8. A method according to clause 7, wherein the determination of whether the input speech signal includes a single user or speaker voice or several user or speaker voices is based on blind speaker clustering.

Clause 9. A method according to any of clauses 5 to 8, wherein determining the one or more signal-quality features comprises determining one or more first channel features from the input speech signal and one or more second channel features associated to the user credentials, and determining a channel difference between the first and second channel features; and wherein
  the higher the channel difference, the lower the signal-quality index is determined; and wherein the lower the channel difference, the higher the signal-quality index is determined.

Clause 10. A method according to clause 9, wherein the determination of the one or more first channel features from the input speech signal is based on analysing an offset component of the input speech signal at log-Mel or cepstral domains.

Clause 11. A method according to any of clauses 9 or 10, wherein determining the channel difference comprises measuring a Euclidean distance or a cosine distance between the one or more first channel features and the one or more second channel features.

Clause 12. A method according to any of clauses 5 to 11, wherein determining the one or more signal-quality features comprises determining a background noise level; wherein the higher the background noise level, the lower the signal-quality index is determined; and wherein the lower the background noise level, the higher the signal-quality index is determined.

Clause 13. A method according to clause 12, wherein determining the background noise level includes applying a signal-to-noise ratio (SNR)-based technique.

Clause 14. A method according to clause 13, wherein applying the signal-to-noise ratio (SNR)-based technique comprises determining a signal-to-noise ratio based on maximum-likelihood estimation depending on an estimated acoustic noise.

Clause 15. A method according to clause 14, wherein the estimation of the acoustic noise is based on minimum statistics and/or based on a multi-channel deep neural network-based technique.

Clause 16. A method according to any of clauses 12 to 15, wherein determining the background noise level comprises comparing a first audio segment in the input speech signal without user or speaker voice and a second audio segment in the input speech signal with user or speaker voice.

Clause 17. A method according to any of clauses 5 to 16, wherein determining the one or more signal-quality features comprises identifying a language from a user or speaker voice in the input speech signal; wherein the signal-quality index is determined higher if the identified language is allowable; and wherein the signal-quality index is determined lower if the identified language is not allowable.

Clause 18. A method according to clause 17, wherein the identification of the language in the input speech signal is based on the use of i-vectors and probabilistic linear discriminant analysis (PLDA) or x-vectors.

Clause 19. A method according to any of clauses 17 or 18, wherein the identified language is allowable if said language corresponds to a predefined language associated to the user credentials and, otherwise, the identified language is not allowable.

Clause 20. A method according to any of clauses 5 to 19, wherein determining the one or more signal-quality features comprises identifying an utterance from a user or speaker voice in the input speech signal through an automatic speech recognition technique, and determining an utterance correspondence between the identified utterance and a predefined utterance of reference; and wherein the higher the utterance correspondence, the higher the signal-quality index is determined; and the lower the utterance correspondence, the lower the signal-quality index is determined.

Clause 21. A method according to clause 20, wherein the automatic speech recognition technique is based on one or more deep neural networks (DNNs).

Clause 22. A method according to clause 21, wherein the automatic speech recognition technique is further based on hidden Markov models (HMMs).

Clause 23. A method according to any of clauses 20 to 22, comprising instructing a user device to request corresponding user of the device to utter the predefined utterance, for the user device to capture said utterance as the input speech signal.

Clause 24. A method according to any of clauses 20 to 23, wherein the predefined utterance is an utterance of reference associated to the user credentials.

Clause 25. A method according to any of clauses 20 to 24, wherein the utterance correspondence includes a word correspondence between words included in the identified utterance and words included in the predefined utterance.

Clause 26. A method according to any of clauses 20 to 25, wherein the utterance correspondence includes a phonetic correspondence between phonetic content in the identified utterance and phonetic content in the predefined utterance.

Clause 27. A method according to any of clauses 5 to 26, wherein determining the one or more signal-quality features comprises determining a duration of a user or speaker voice in the input speech signal and determining a duration correspondence between the determined duration and a predefined duration of reference; and wherein the higher the duration correspondence, the higher the signal-quality index is determined; and the lower the duration correspondence, the lower the signal-quality index is determined.

Clause 28. A method according to clause 27, wherein determining the duration of the user or speaker voice includes applying a technique for detecting voice activity or speech duration based on DNNs.

Clause 29. A method according to any of clauses 5 to 28, wherein determining the one or more signal-quality features comprises determining an alcohol intoxication level from a user or speaker voice included in the input speech signal; and wherein the higher the alcohol intoxication level, the lower the signal-quality index is determined; and the lower the alcohol intoxication level, the higher the signal-quality index is determined.

Clause 30. A method according to clause 29, wherein the alcohol intoxication level is determined by using prosodic speech characteristics.

Clause 31. A method according to any of clauses 3 to 30, wherein the predefined signal-validity criteria include predefined spoofing-detection criteria; and wherein determining the validity of the input speech signal comprises determining, based on the predefined spoofing-detection criteria, one or more spoofing-related features in the input speech signal and a spoofing index of the input speech signal depending on the one or more spoofing-related features; and determining the validity of the input speech signal depending on the determined spoofing index.

Clause 32. A method according to clause 31, wherein the higher the spoofing index, the lower the validity of the input speech signal is determined; and the lower the spoofing index, the higher the validity of the input speech signal is determined.

Clause 33. A method according to any of clauses 31 or 32, wherein determining the one or more spoofing-related features comprises verifying whether the input speech signal includes an ultrasonic pseudorandom code corresponding to a predefined code of reference; and wherein the spoofing index is determined lower if the input speech signal includes said ultrasonic pseudorandom code; and the spoofing index is determined higher if the input speech signal does not include said ultrasonic pseudorandom code.

Clause 34. A method according to clause 33, wherein the verification of whether the input speech signal includes the ultrasonic pseudorandom code is based on a spectral analysis technique.

Clause 35. A method according to any of clauses 33 or 34, further comprising generating the ultrasonic pseudorandom code and instructing a user device to play the ultrasonic pseudorandom code during capture of the input speech signal by the user device, so as to cause inclusion of the ultrasonic pseudorandom code in the input speech signal.

Clause 36. A method according to any of clauses 33 to 35, wherein the predefined code of reference is an ultrasonic pseudorandom code associated to the user credentials.

Clause 37. A method according to any of clauses 31 to 36, wherein determining the one or more spoofing-related features comprises determining single-channel replay attack indicia; and wherein the more single-channel replay attack indicia, the higher the spoofing index is determined; and the less single-channel replay attack indicia, the lower the spoofing index is determined.

Clause 38. A method according to clause 37, wherein the single-channel replay attack indicia are determined by using a classifier of acoustic features based on support vector machines (SVMs).

Clause 39. A method according to any of clauses 31 to 38, wherein determining the one or more spoofing-related features includes determining multi-channel replay attack indicia; and wherein the more multi-channel replay attack indicia, the higher the spoofing index is determined; and the less multi-channel replay attack indicia, the lower the spoofing index is determined.

Clause 40. A method according to clause 39, wherein the multi-channel replay attack indicia are determined by calculating incidence relations of different microphones, used to capture the input speech signal, on single-channel components of the input speech signal, and using a classifier trained to identify multi-channel replay attack indicia depending on said incidence relations.

Clause 41. A method according to clause 40, wherein calculating the incidence relations of microphones on single-channel components comprises calculating relative channel responses between the microphones by performing a single-microphone blind channel identification method for speech based on using spectrum classification.

Clause 42. A method according to clause 41, wherein calculating the incidence relations of microphones on single-channel components comprises:

forming an N×N matrix H with relative channel responses between microphones $\{h_{ji}; i, j=1, \ldots, N\}$, wherein N is the total number of microphones used to capture the input speech signal, and $h_{ij}$ is the relative channel response between i-th and j-th microphone; and providing the whole or part of the matrix H to the classifier trained to identify multi-channel replay attack indicia.

Clause 43. A method according to any of clauses 40 to 42, wherein the classifier trained to identify multi-channel replay attack indicia is based on support vector machines (SVMs).

Clause 44. A method according to any of clauses 31 to 43, wherein determining the one or more spoofing-related features includes determining magnetically-inferred replay attack indicia by verifying whether a magnetic field measurement from a user device used to captured the input speech signal is above or below a predefined magnetic field threshold; and wherein the more magnetically-inferred replay attack indicia, the higher the spoofing index is determined; and the less magnetically-inferred replay attack indicia, the lower the spoofing index is determined.

Clause 45. A method according to clause 44, comprising instructing the user device to obtain the magnetic field measurement through a corresponding magnetometer during capture of the input speech signal.

Clause 46. A method according to clause 45, comprising averaging the magnetic field measurement from the user device to obtain an average magnetic field measurement over time during capture of the input speech signal, so as to compare said average magnetic field measurement with the predefined magnetic field threshold to determine the magnetically-inferred replay attack indicia.

Clause 47. A method according to any of clauses 1 to 46, comprising performing a score calibration $\sigma(x)$ of the user or speaker authentication; wherein x represents a score of the user or speaker authentication; and wherein the closer to 1 is $\sigma(x)$, the more successful the user or speaker authentication is determined, and the closer to 0 is $\sigma(x)$, the less successful the user or speaker authentication is determined.

Clause 48. A method according to clause 47, wherein the score calibration $\sigma(x)$ is a sigmoid calibration.

Clause 49. A method according to any of clauses 47 or 48, wherein the updating of the reference voiceprint is performed further depending on whether the score calibration $\sigma(x)$ is above or below a predefined calibration threshold $\Psi$.

Clause 50. A method according to clause 49, wherein the score x is determined by a classifier trained to determine the score x of the speech voiceprint $v_t^{(s')}$ representing the input speech signal of user or speaker s' at time t against the reference voiceprint $e_{t-1}^{(s)}$ of user or speaker s at past time t−1; wherein s'=s in case of legitimate trial, and s'≠s otherwise.

Clause 51. A method according to clause 50, wherein the score calibration $\sigma(x)$ not greater than the predefined calibration threshold $\Psi$ denotes that the result of the updating $e_t^{(s)}$ is to be equal to the reference voiceprint $e_{t-1}^{(s)}$ to be updated.

Clause 52. A method according to clause 51, wherein the updating of the reference voiceprint is performed based on the following formula:

$$e_t^{(s)} = \lambda(\sigma(x),\Psi,\gamma) e_{t-1}^{(s)} + (1-\lambda(\sigma(x),\Psi,\gamma)) v_t^{(s')}$$

wherein $e_t^{(s)}$ corresponds to the updated reference voiceprint, $e_{t-1}^{(s)}$ corresponds to the reference voiceprint to be updated, $v_t^{(s')}$ corresponds to the speech voiceprint, and $\lambda(\sigma(x),\Psi,\gamma)$ corresponds to a remembering factor balancing a relative importance of $e_{t-1}^{(s)}$ and $v_t^{(s)}$ in the updating.

Clause 53. A method according to clause 52, wherein the remembering factor $\lambda(\sigma(x),\Psi,\gamma)$ is a truncated monotonic decreasing linear function.

Clause 54. A method according to clause 53, wherein the remembering factor $\lambda(\sigma(x),\Psi,\gamma)$ is determined based on following formula:

$$\lambda(\sigma(x), \Psi, \gamma) = \max\left(\frac{(\gamma - 1)\sigma(x) + \gamma(1 - \Psi)}{\gamma - \Psi}, \gamma\right)$$

wherein $\alpha$ is a predefined heuristic factor indicating a minimum importance of $e_{t-1}^{(s)}$ during the updating.

Clause 55. A method according to any of clauses 53 or 54, wherein the predefined calibration threshold $\Psi$ is less than the predefined heuristic factor $\gamma$.

Clause 56. A method according to any of clauses 53 to 55, wherein when the score calibration $\sigma(x)$ is not less than the predefined heuristic factor $\gamma$, the remembering factor $\lambda(\sigma(x),\Psi,\gamma)$ is equal to $\alpha$ and, therefore, maximum importance is attributed to the speech voiceprint $v_t^{(s')}$ representing the input speech signal in the updating:

$$e_t^{(s)} = v_t^{(s')} + \gamma(e_{t-1}^{(s)} - v_t^{(s')}).$$

Clause 57. A method according to any of clauses 51 to 56, wherein when the score calibration σ(x) lies between the predefined calibration threshold Ψ and the predefined heuristic factor α, the remembering factor λ(σ(x),Ψ,γ) is equal to $$\frac{(\gamma-1)\sigma(x)+\gamma(1-\Psi)}{\gamma-\Psi}$$

and, therefore, an importance is attributed to the speech voiceprint $v_t^{(s')}$ that linearly increases as the score calibration σ(x) is closer to the predefined heuristic factor α:

$$e_t^{(s)} = \frac{(\gamma-1)\sigma(x)+\gamma(1-\Psi)}{\gamma-\Psi}e_{t-1}^{(s)} + \left(1-\frac{(\gamma-1)\sigma(x)+\gamma(1-\Psi)}{\gamma-\Psi}\right)v_t^{(s')}.$$

Clause 58. A computer program comprising program instructions for causing a computing system to perform a method according to any of clauses 1 to 57 of authenticating a user or speaker.

Clause 59. A computer program according to clause 58, embodied on a storage medium.

Clause 60. A computer program according to clause 58, carried on a carrier signal.

Clause 61. A computing system for authenticating a user or speaker, the computing system comprising a memory and a processor, embodying instructions stored in the memory and executable by the processor, the instructions comprising functionality to execute a method according to any of clauses 1 to 57 of authenticating a user.

Clause 62. A system for authenticating a user or speaker, comprising:
an obtaining module configured to obtain an input speech signal and user credentials identifying the user or speaker, the input speech signal including a single-channel or multi-channel speech signal;
an extraction module configured to extract a speech voiceprint from the input speech signal;
a retrieving module configured to retrieve a reference voiceprint associated to the user credentials;
a correspondence module configured to determine a voiceprint correspondence between the speech voiceprint and the reference voiceprint;
an authentication module configured to authenticate the user or speaker depending on the voiceprint correspondence; and
an updating module configured to update the reference voiceprint depending on the speech voiceprint corresponding to the authenticated user or speaker.

Clause 63. A system according to clause 62, wherein all the modules of the system are comprised in a computing server; and wherein the obtaining module is configured to receive the input speech signal and the user credentials from a user device through a connection between the computing server and the user device.

Clause 64. A system according to clause 62, wherein some of the modules of the system are comprised in a computing server and remaining modules of the system are comprised in a user device connected with the computing server and configured to capture the input speech signal and the user credentials.

Clause 65. A system according to any of clauses 63 or 64, wherein the computing server is a cloud server, and/or the user device is a portable device, and/or the connection between the computing server and the user device is an Internet based connection.

Clause 66. An online banking system configured to authorize a user to perform one or more banking functionalities in the online banking system depending on a user authentication performed by an authentication system according to any of clauses 62 to 65.

Clause 67. An online banking according to clause 66, including the authentication system.

REFERENCES TO PRIOR ART DISCLOSURES

[Ephraim85] Y. Ephraim and D. Malah: "Speech enhancement using a minimum mean-square error log-spectral amplitude estimator", IEEE Transactions on Acoustics, Speech, and Signal Processing, vol. 33, pp. 443-445, 1985.

[Filonenko10] V. Filonenko, C. Cullen and J. D. Carswell: "Investigating ultrasonic positioning on mobile phones", IPIN 2010, Zurich, Switzerland, 2010.

[Gaubitch11] N. D. Gaubitch, M. Brookes, P. A. Naylor and D. Sharma: "Single-Microphone Blind Channel Identification in Speech Using Spectrum Classification", EUSIPCO 2011, Barcelona, Spain, 2011.

[Gaubitch13] N. D. Gaubitch, M. Brookes and P. A. Naylor: "Blind Channel Magnitude Response Estimation in Speech Using Spectrum Classification", IEEE Transactions on Audio, Speech, and Language Processing, vol. 21, pp. 2162-2171, 2013.

[Hinton12] G. Hinton, L. Deng, D. Yu, G. E. Dahl, A. Mohamed, N. Jaitly, A. Senior, V. Vanhoucke, P. Nguyen, T. N. Sainath and B. Kingsbury: "Deep Neural Networks for Acoustic Modeling in Speech Recognition: The Shared Views of Four Research Groups", IEEE Signal Processing Magazine, vol. 29, pp. 82-97, 2012.

[Iyer06] A. N. Iyer, U. O. Ofoegbu, R. E. Yantorno and B. Y. Smolenski: "Blind Speaker Clustering", ISPACS 2006, Tottori, Japan, 2006.

[Levit01] M. Levit, R. Huber, A. Batliner and E. Noeth: "Use of prosodic speech characteristics for automated detection of alcohol intoxication", ITRW 2001, Red Bank, NJ, USA, 2001.

[López16] I. López-Espejo, A. M. Peinado, A. M. Gomez and J. M. Martin-Doñes: "Deep Neural Network-Based Noise Estimation for Robust ASR in Dual-Microphone Smartphones", Lecture Notes in Computer Science, vol. 10077, pp. 117-127, 2016.

[Martin01] R. Martin: "Noise Power Spectral Density Estimation Based on Optimal Smoothing and Minimum Statistics", IEEE Transactions on Speech, and Audio Processing, vol. 9, pp. 504-512, 2001.

[Rai16] M. K. Rai, Neetish, M. S. Fahad, J. Yadav and K. S. Rao: "Language identification using PLDA based on i-vector in noisy environment", ICACCI 2016, Jaipur, India, 2016.

[Snyder18] D. Snyder, D. Garcia-Romero, A. McCree, G. Sell, D. Povey and S. Khudanpur: "Spoken Language Recognition using X-vectors", Odyssey 2018, Les Sables-d'Olonne, France, 2018.

[Villalba11] J. Villalba and E. Lleida: "Preventing replay attacks on speaker verification systems", ICCST 2011, Barcelona, Spain, 2011.

[Zhang13] X. L. Zhang and J. Wu: "Deep Belief Networks Based Voice Activity Detection", IEEE Transactions on Audio, Speech, and Language Processing, vol. 21, pp. 697-710, 2013.

What is claimed is:

1. A method of authenticating a user or speaker, comprising:
   obtaining an input speech signal and user credentials identifying the user or speaker, the input speech signal including a single-channel or multi-channel speech signal;
   determining a validity of the input speech signal, the determining including:
      determining, based on predefined spoofing-detection criteria, one or more spoofing-related features in the input speech signal;
      determining a spoofing index of the input speech signal depending on the one or more spoofing-related features; and
      determining the validity of the input speech signal depending on the determined spoofing index;
   extracting a speech voiceprint from the input speech signal;
   retrieving a reference voiceprint associated to the user credentials;
   determining a voiceprint correspondence between the speech voiceprint and the reference voiceprint;
   authenticating or not authenticating the user or speaker depending on the voiceprint correspondence; and
   upon authenticating the user or speaker, using the speech voiceprint used in the authenticating to update the reference voiceprint;
   wherein determining the one or more spoofing-related features includes determining multi-channel replay attack indicia, a value of the spoofing index depending on the number of multi-channel replay attack indicia, the value of the spoofing index increases as the number of multi-channel replay attack indicia increases, the value of the spoofing index decreases as the number of multi-channel replay attack indicia decreases.

2. The method according to claim 1, further comprising determining a validity of the input speech signal, the determining including:
   by use of a device, prompting the user or speaker to utter a predefined utterance of reference, and capturing the utterance as the input speech signal;
   identifying the utterance from a voice of the user or speaker in the input speech signal through an automatic speech recognition technique;
   determining an utterance correspondence between the identified utterance and the predefined utterance of reference; and
   determining the validity of the input speech signal depending on the utterance correspondence, in such a way that the higher the utterance correspondence the higher the validity of the input speech signal is determined, and the lower the utterance correspondence the lower the validity of the input speech signal is determined.

3. The method according to claim 2, wherein the predefined utterance is an utterance of reference associated to the user credentials.

4. The method according to claim 1, wherein determining the one or more spoofing-related features comprises verifying whether the input speech signal includes an ultrasonic pseudorandom code corresponding to a predefined code of reference; and
   wherein the spoofing index is determined lower if the input speech signal includes the ultrasonic pseudorandom code; and the spoofing index is determined higher if the input speech signal does not include the ultrasonic pseudorandom code.

5. The method according to claim 4, further comprising generating the ultrasonic pseudorandom code and instructing the user or speaker to play the ultrasonic pseudorandom code during capture of the input speech signal, so as to cause inclusion of the ultrasonic pseudorandom code in the input speech signal.

6. The method according to claim 4, wherein the predefined code of reference is an ultrasonic pseudorandom code associated to the user credentials.

7. The method according to claim 1, wherein the multi-channel replay attack indicia are determined by calculating incidence relations of different microphones, used to capture the input speech signal, on single-channel components of the input speech signal, and using a classifier trained to identify multi-channel replay attack indicia depending on the incidence relations.

8. The method according to claim 7, wherein calculating the incidence relations of microphones on single-channel components comprises calculating relative channel responses between the microphones by performing a single-microphone blind channel identification method for speech based on using spectrum classification.

9. The method according to claim 8, wherein calculating the incidence relations of microphones on single-channel components comprises:
   forming an N×N matrix H with relative channel responses between microphones $\{h_{ij}, i, j=1, \ldots, \text{NI}\}$, wherein N is the total number of microphones used to capture the input speech signal, and $h_{ij}$ is the relative channel response between i-th and j-th microphone; and
   providing the whole or part of the matrix H to the classifier trained to identify multi-channel replay attack indicia.

10. The method according to claim 1, wherein determining the one or more spoofing-related features includes determining magnetically-inferred replay attack indicia by verifying whether a magnetic field measurement from a user device used to captured the input speech signal is above or below a predefined magnetic field threshold; and wherein
    the more magnetically-inferred replay attack indicia, the higher the spoofing index is determined; and the less magnetically-inferred replay attack indicia, the lower the spoofing index is determined.

11. The method according to claim 10, comprising obtaining the magnetic field measurement through a corresponding magnetometer during capture of the input speech signal.

12. The method according to claim 11, comprising averaging the magnetic field measurement to obtain an average magnetic field measurement over time during capture of the input speech signal, so as to compare the average magnetic field measurement with the predefined magnetic field threshold to determine the magnetically-inferred replay attack indicia.

13. The method according to claim 1, wherein the updating of the reference voiceprint is performed based on the following formula:

$$e_t^{(s)} = \frac{(\gamma-1)\sigma(x)+\gamma(1-\Psi)}{\gamma-\Psi} e_{t-1}^{(s)} + \left(1 - \frac{(\gamma-1)\sigma(x)+\gamma(1-\Psi)}{\gamma-\Psi}\right) v_t^{(s')}.$$

wherein $e_t^{(s)}$ corresponds to the updated reference voiceprint, $e_{t-1}^{(s)}$ corresponds to the reference voiceprint to be updated, $v_t^{(s)}$ corresponds to the speech voiceprint, and $\lambda(\sigma(\chi),\psi, \gamma)$ corresponds to a remembering factor balancing a relative importance of $e_{t-1}^{(s)}$ and $v_t^{(s)}$ in the updating, optionally said remembering factor $\lambda(\sigma(\chi),\psi, \gamma)$ being a truncated monotonic decreasing linear function.

14. The method according to claim 13, wherein the remembering factor $\lambda(\sigma(\chi),\psi, \gamma)$ is determined based on following formula:

$$\lambda(\sigma(x), \Psi, \gamma) = \max\left(\frac{(\gamma - 1)\sigma(x) + \gamma(1 - \Psi)}{\gamma - \Psi}, \gamma\right)$$

wherein $\gamma$ is a predefined heuristic factor indicating a minimum importance of $e_{t-1}^{(s)}$ during the updating.

15. The method according to claim 14, wherein the predefined calibration threshold $\psi$ is less than the predefined heuristic factor $\gamma$.

16. The method according to claim 14, comprising performing a score calibration $\sigma(\chi)$ of the user or speaker authentication; wherein $\chi$ represents a score of the user or speaker authentication; and wherein the closer to 1 is $\sigma(\chi)$, the more successful the user or speaker authentication is determined, and the closer to 0 is $\sigma(\chi)$, the less successful the user or speaker authentication is determined; and wherein when the score calibration $\sigma(\chi)$ is not less than the predefined heuristic factor $\gamma$, the remembering factor $\lambda(\sigma(\chi),\psi, \gamma)$ is equal to $\gamma$ and, therefore, maximum importance is attributed to the speech voiceprint $v_t^{(s')}$ representing the input speech signal in the updating:

$$e_t^{(s)} = \lambda(\sigma(x),\Psi,\gamma)e_{t-1}^{(s)} + (1-\lambda(\sigma(x),\Psi,\gamma))v_t^{(s')}.$$

17. The method according to claim 14, comprising performing a score calibration $\sigma(\chi)$ of the user or speaker authentication; wherein $\chi$ represents a score of the user or speaker authentication; and wherein the closer to 1 is $\sigma(\chi)$, the more successful the user or speaker authentication is determined, and the closer to 0 is $\sigma(\chi)$, the less successful the user or speaker authentication is determined; and wherein when the score calibration $\sigma(\chi)$ lies between the predefined calibration threshold and the predefined heuristic factor $\gamma$, the remembering factor $\lambda(\sigma(\chi),\psi, \gamma)$ is equal to $$\frac{(\gamma - 1)\sigma(x) + \gamma(1 - \Psi)}{\gamma - \Psi}$$

and, therefore, an importance is attributed to the speech voiceprint $v_t^{(s')}$ that linearly increases as the score calibration $\sigma(\times)$ is closer to the predefined heuristic factor $\gamma$:

$$e_t^{(s)} = \frac{(\gamma - 1)\sigma(x) + \gamma(1 - \Psi)}{\gamma - \Psi} e_{t-1}^{(s)} + \left(1 - \frac{(\gamma - 1)\sigma(x) + \gamma(1 - \Psi)}{\gamma - \Psi}\right)v_t^{(s')}.$$

18. A computing system for authenticating a user or speaker, the computing system comprising a memory and a processor, embodying instructions stored in the memory and executable by the processor, the instructions comprising functionality to execute a method according to claim 1.

19. A method of authenticating a user or speaker, comprising:

obtaining an input speech signal and user credentials identifying the user or speaker, the input speech signal including a single-channel or multi-channel speech signal;

determining a validity of the input speech signal, the determining including:
determining, based on predefined spoofing-detection criteria, one or more spoofing-related features in the input speech signal;
determining a spoofing index of the input speech signal depending on the one or more spoofing-related features; and
determining the validity of the input speech signal depending on the determined spoofing index;

extracting a speech voiceprint from the input speech signal;

retrieving a reference voiceprint associated to the user credentials;

determining a voiceprint correspondence between the speech voiceprint and the reference voiceprint;

authenticating or not authenticating the user or speaker depending on the voiceprint correspondence; and upon authenticating the user or speaker, using the speech voiceprint used in the authenticating to update the reference voiceprint;

wherein determining the one or more spoofing-related features comprises verifying whether the input speech signal includes an ultrasonic pseudorandom code corresponding to a predefined code of reference;

wherein the spoofing index is determined lower if the input speech signal includes the ultrasonic pseudorandom code; and the spoofing index is determined higher if the input speech signal does not include the ultrasonic pseudorandom code; and wherein the predefined code of reference is an ultrasonic pseudorandom code associated to the user credentials.

20. A method of authenticating a user or speaker, comprising:

obtaining an input speech signal and user credentials identifying the user or speaker, the input speech signal including a single-channel or multi-channel speech signal;

extracting a speech voiceprint from the input speech signal;

retrieving a reference voiceprint associated to the user credentials;

determining a voiceprint correspondence between the speech voiceprint and the reference voiceprint;

authenticating or not authenticating the user or speaker depending on the voiceprint correspondence; and upon authenticating the user or speaker, using the speech voiceprint used in the authenticating to update the reference voiceprint:

wherein the updating of the reference voiceprint is performed based on the following formula:

$$e_t^{(s)} = \lambda(\sigma(x),\Psi,\gamma)e_{t-1}^{(s)} + (1-\lambda(\sigma(x),\Psi,\gamma))v_t^{(s')}$$

wherein $e_t^{(s)}$ corresponds to the updated reference voiceprint, $e_{t-1}^{(s)}$ corresponds to the reference voiceprint to be updated, $v_t^{(s')}$ corresponds to the speech voiceprint, and $\lambda(\sigma(\chi),\psi, \gamma)$ corresponds to a remembering factor balancing a relative importance of $e_{t-1}^{(s)}$ and $v_t^{(s')}$ in the updating, optionally said remembering factor $\lambda(\sigma(\chi),\psi, \gamma)$ being a truncated monotonic decreasing linear function;

wherein the remembering factor $\lambda(\sigma(\chi),\psi, \gamma)$ is determined based on following formula:

$$\lambda(\sigma(x), \Psi, \gamma) = \max\left(\frac{(\gamma - 1)\sigma(x) + \gamma(1 - \Psi)}{\gamma - \Psi}, \gamma\right)$$

wherein $\gamma$ is a predefined heuristic factor indicating a minimum importance of $e_{t-1}^{(s)}$ during the updating.

* * * * *